Oct. 26, 1926.
G. LAMBERT
1,604,127
CROSS WORD PUZZLE BLOCK
Filed Sept. 25, 1925   2 Sheets-Sheet 1
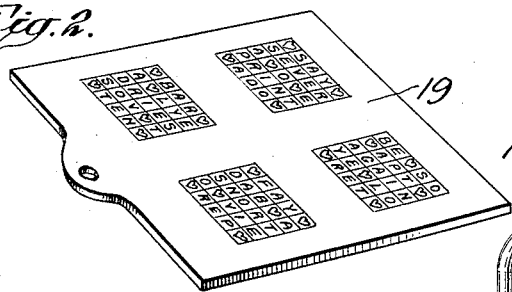
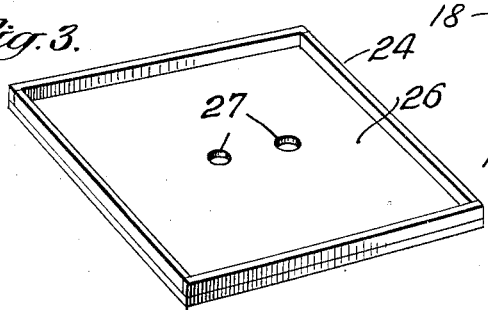
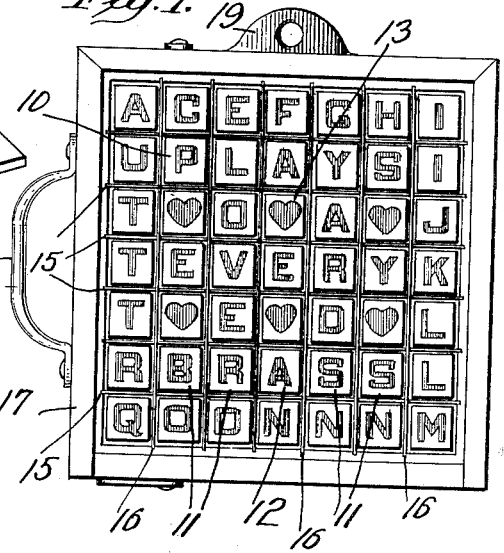
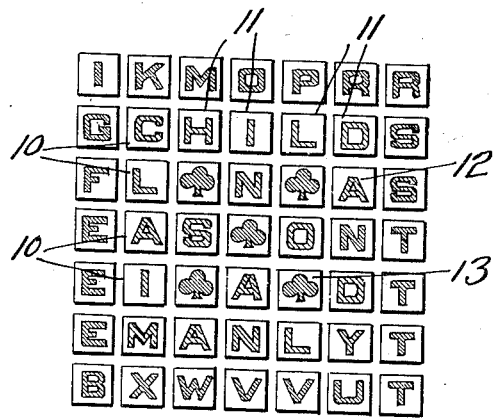
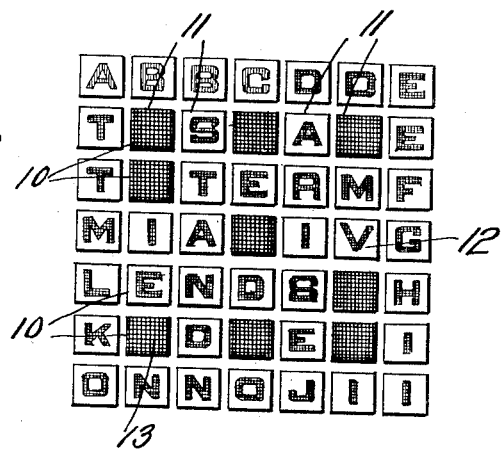
INVENTOR
GEORGE LAMBERT
BY
*Geo. S. Wheelock*
ATTORNEY Oct. 26, 1926.
G. LAMBERT
1,604,127
CROSS WORD PUZZLE BLOCK
Filed Sept. 25, 1925    2 Sheets-Sheet 2
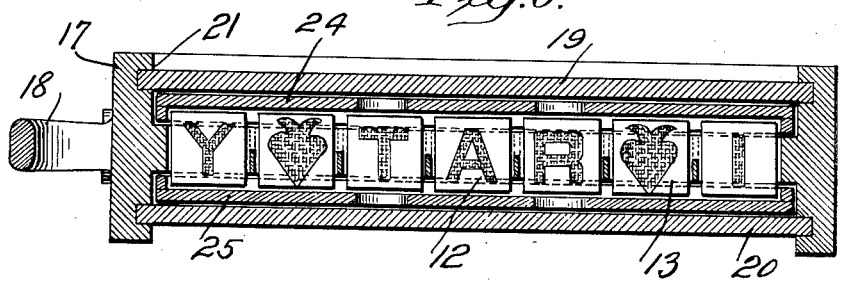
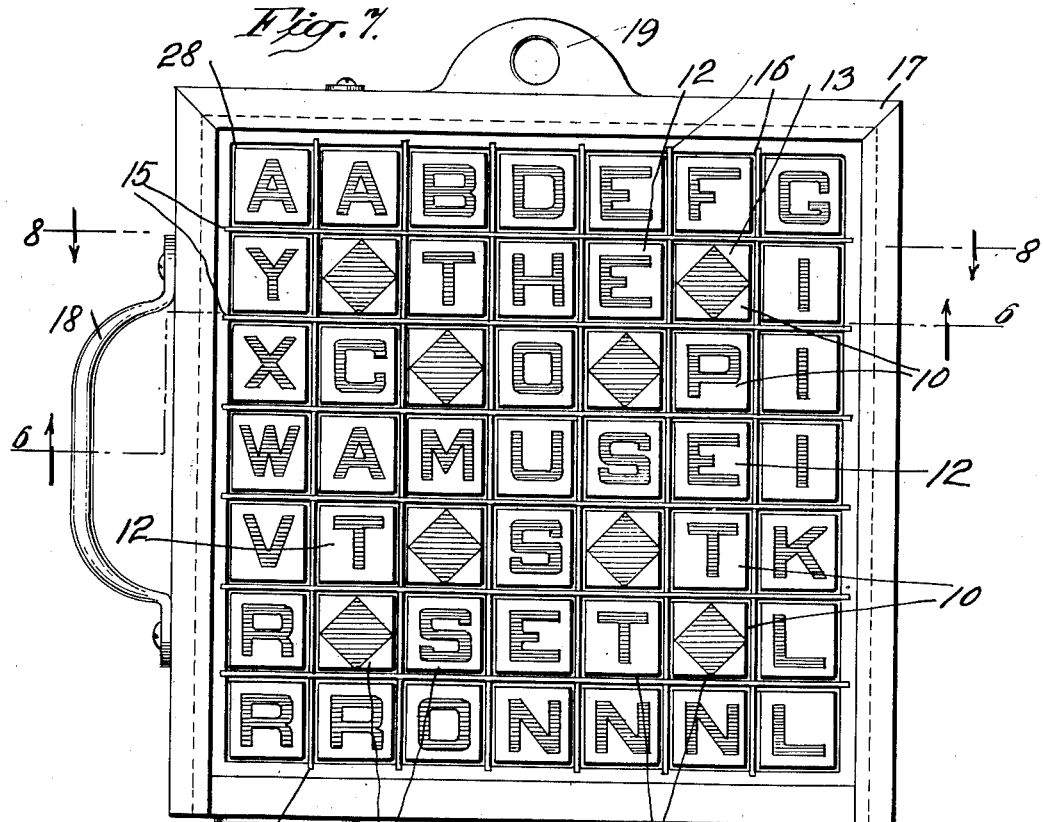
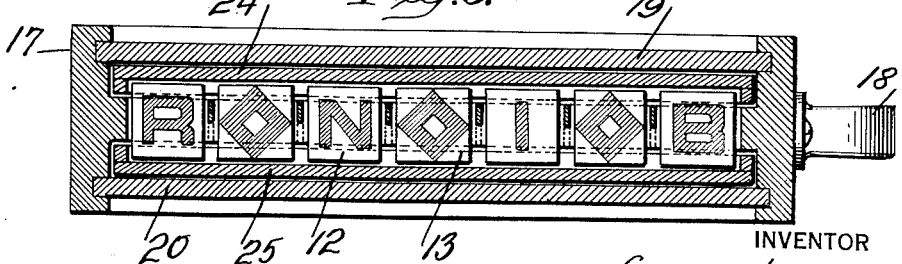
INVENTOR
GEORGE LAMBERT
BY Geo. L. Wheelock
ATTORNEY Patented Oct. 26, 1926.

1,604,127

UNITED STATES PATENT OFFICE.

GEORGE LAMBERT, OF BROOKLYN, NEW YORK.

CROSS-WORD-PUZZLE BLOCK.

Application filed September 25, 1925. Serial No. 58,569.

The invention relates to a set of cross-word puzzle blocks.

The object of the invention is to produce a set of lettered blocks in which the letters are arranged to form longitudinally and transversely extending words when the blocks are positioned according to a given design or pattern, so as thereby to provide a novel and improved form of entertainment and instruction. To this end the invention consists in the set of cross-word puzzle blocks hereinafter described and particularly pointed out in the appended claims.

In the accompanying drawings illustrating the invention:

Fig. 1 is a top plan of a set of blocks arranged according to the invention and shown enclosed in a box by which they may be conveniently handled and carried;

Fig. 2 is a perspective view of one of the two sliding covers of the box, showing thereon four diagrams or patterns according to which the cross-words are to be formed;

Fig. 3 is a perspective view of one of the trays in which the blocks may be removed from the box without disturbing the arrangement of the blocks;

Figs. 4 and 5 are plan views showing other surfaces of the blocks;

Fig. 6 is a section taken along the line 66 of Fig. 7;

Fig. 7 is an enlarged bottom plan of the blocks shown in Fig. 1, and

Fig. 8 is a section taken along the line 8—8 of Fig. 7.

The set of cross-word puzzle blocks constituting the invention comprises a series of unit members or blocks arranged in a plurality of longitudinally extending rows 10 and a plurality of transversely extending rows 11. On each surface of the blocks is placed a letter 12 or an ornament or design 13. The lettered blocks 12 and the ornamental blocks 13 are so arranged as to form a plurality of longitudinally extending and a plurality of transversely extending words, whether the first and second, third and fourth, or fifth and sixth surfaces of the blocks are uppermost or lowermost, as will be presently explained. The ornamental surfaces 13 are interposed at various points in the longitudinal and transverse rows of words so as to present a pleasing and attractive design as well as to act as bounds or terminals for the words.

In the arrangement of the set of cross-word puzzle blocks shown in the drawings there are five longitudinally extending rows 10 and five transversely extending rows 11. Inasmuch as each block is a cube it possesses six surfaces. We may therefore have six upper and lower surfaces containing longitudinally and transversely extending words when the blocks are properly turned and arranged in a designated relationship one with another. For clarity of description and as an aid to understanding the invention, it is convenient to designate each of the six surfaces of the blocks as the first and second, third and fourth and fifth and sixth surfaces. In accordance with the invention all the corresponding surfaces, that is to say, all the first and second, third and fourth, and so on, surfaces of all the blocks will always occupy the same relative position. Thus all the first and second surfaces will either be uppermost or lowermost, facing to the front (toward the bottom of the sheets), facing to the rear (toward the top of the sheets), facing to the right hand or facing to the left hand, and all the other surfaces will always occupy the same positions relatively to each other according to the way in which all the blocks are turned. In the illustrated embodiment of the invention, Fig. 1 shows the first surfaces of the blocks uppermost. In Fig. 7 the second surfaces of the blocks are shown uppermost. By comparing Figs. 1 and 7, it will be understood that the second surfaces are lowermost in Fig. 1, and that in Fig. 7 the first surfaces are lowermost. In Fig. 4, the third surfaces are shown uppermost; and in Fig. 5 the fourth surfaces are shown uppermost. It will be understood in comparing Figs. 4 and 5, that in Fig. 4 the fourth surfaces are lowermost; and conversely that in Fig. 5 the third surfaces are lowermost. The fifth surfaces of one row of blocks, facing the bottom of the sheets, are shown in Fig. 6; and the sixth surfaces of one row of blocks, facing the top of the sheets in Figs. 1 and 7, are shown in Fig. 8.

As a ready means of identifying the letters belonging to each surface of the set of blocks as a whole, the first surfaces of the individual blocks are colored red, as indicated in Fig. 1; the second surfaces are colored blue, as indicated in Fig. 7; the third surfaces are colored green, as indicated in Fig. 4; the fourth surfaces are made black, as indicated in Fig. 5; the fifth surfaces are colored yellow, as indicated in Fig. 6; and the sixth surfaces are colored purple, as indicated in Fig. 8.

Each of the six surfaces of the set of blocks as a whole, has its particular kind of ornament 13. These ornaments, of course, may be varied to suit the individual fancy. Appropriate ornaments are shown in the various figures. These ornaments take the place of spaces or blocks and define or limit the boundaries of the longitudinally and transversely extending words. To have a more pleasing effect the ornaments have the same color as the letters belonging to the same series of surfaces.

The letters in each of the six surfaces of the set of blocks as a whole, are arranged to form longitudinally and transversely extending words, the ornamental blocks being interposed at appropriate places to separate the two series of words. The arrangement of the various words longitudinally and transversely is optional. When, however, a particular arrangement is determined upon, that arrangement is fixed for any particular set of blocks. For example, in Fig. 1 the longitudinally extending words are: "Plays", "Every", and "Brass"; and the transversely extending words are: "Lover", and "Yards". The words on the second or lowermost surface, shown uppermost in Fig. 7, are, longitudinally: "The", "Amuse", and "Set"; and transversely:— "Cat", "House", and "Pet". In like manner there are longitudinally and transversely extending words on the third, fourth, fifth and sixth surfaces.

If now all the blocks constituting the set of word making blocks shown in Fig. 1 are turned one quarter of a turn toward the top of the sheet, the third surface of the set of blocks will come uppermost, as shown in Fig. 4, and the fourth surface of the set of blocks (shown uppermost in Fig. 5) will be lowermost. In like manner the fifth and sixth surfaces will be brought uppermost and lowermost by next turning the blocks a quarter turn either to the left hand or to the right hand. In each case the longitudinally and transversely extending words will appear uppermost or lowermost according to the direction in which the blocks are turned, it being understood that all the blocks are turned alike. The blocks are restored to their initial position by turning them in the reverse directions.

It will be understood that there may be any preferred number of longitudinally and transversely extending rows of blocks constituting the set and therefore any preferred number of longitudinally and transversely extending rows of words. In the illustrated embodiment of the invention there are five longitudinally extending and five transversely extending rows of blocks. The blocks are conveniently mounted and held in partitions formed by the longitudinally extending strips 15 and the transversely extending strips 16. These strips are held in place in a frame constituting a box or casing 17, provided with a handle 18 by which a set of blocks may be carried. The open faces of the casing 17 are closed by the slide covers 19 and 20 which slide within lateral groves 21 in the sides of the frame or casing 17. Two covers are provided so that when the first, third and fifth surfaces are turned uppermost the second, fourth and sixth, or lowermost surfaces, may be brought uppermost and exposed to view by turning the box upside down and removing the cover 20, thereby halving the work in turning the blocks to bring the cross words into view. Means are provided for removing the blocks as a whole from the box 17 so that they can be more conveniently handled individually consisting of the two trays 24 and 25, inverted over the blocks under the covers 19 and 20, as clearly shown in Figs. 6 and 8. The tray 19 is shown in perspective in Fig. 3. To facilitate the handling of the trays the bottoms 26 thereof are provided with the two finger holes 27.

In order that additional cross-words may be formed, extra lettered blocks are provided and conveniently carried in the external longitudinal and transverse rows 28 surrounding the cross-word puzzle set of blocks occupying the five middle longitudinal and transverse rows. In order that the person using the set of blocks may arrange them according to the fixed system of cross-words formed according to the principle of the invention, diagrams thereof are conveniently shown on either the upper or lower surfaces of the cover 19 and 20, as indicated in Fig 2.

It will be fully understood from Figs. 1 and 7 that the letters are so arranged on the blocks that when the blocks are set up to form cross-words reading at one face of the set-up blocks, different crosswords will be found at the other face of the set-up blocks. It will also be understood that the frame 17 and the intersecting strips 15 and 16 provide longitudinal and transverse rows of pockets in the frame in which the blocks may be set to form words, reading differently at the different faces of the frame. So that the invention is basic enough to include cross-word blocks, the letters of which are previously so calculated by the manufacturer that different words will be formed at the opposite faces of the set-up blocks whether or not the set-up blocks are placed in a frame.

What I claim as my invention and desire to secure by Letters Patent, is:

1. A set of cross-word puzzle blocks adapted to be arranged in a plurality of longitudinal and transverse rows, some of the surfaces of said blocks being each provided with a letter and the remaining surfaces being each provided with an ornament, whereby the blocks may be so arranged that the letters form longitudinally and transversely extending words or legends, whether the first and second, third and fourth, or fifth and sixth surfaces of the blocks are lowermost or uppermost and the ornaments may be symmetrically arranged to separate the words or legends appearing on any one line.

2. A set of cross-word puzzle blocks adapted to be arranged in a plurality of longitudinal and transverse rows, some of the surfaces of said blocks being each provided with a letter and the remaining surfaces being each provided with an ornament, whereby said blocks may be so arranged that the letters on the upper and lower surfaces form different sets of longitudinally and transversely extending words and said upper and lower surfaces being readily distinguishable from one another.

3. A puzzle of the character described comprising a plurality of unit-members having suitable indicia on their opposite surfaces, some of the indicia being letters and others being ornaments and said opposite surfaces being distinguishable from one another, said unit-members being capable of arrangement in rectangular formation of a plurality of transverse rows so that the letters form different sets of cross-words and legends on opposite surfaces of the rectangular formation, and the ornaments serving to fill in blank spaces and to separate words appearing in any one row.

In testimony whereof I hereunto affix my signature.

GEORGE LAMBERT.